Patented Jan. 26, 1932

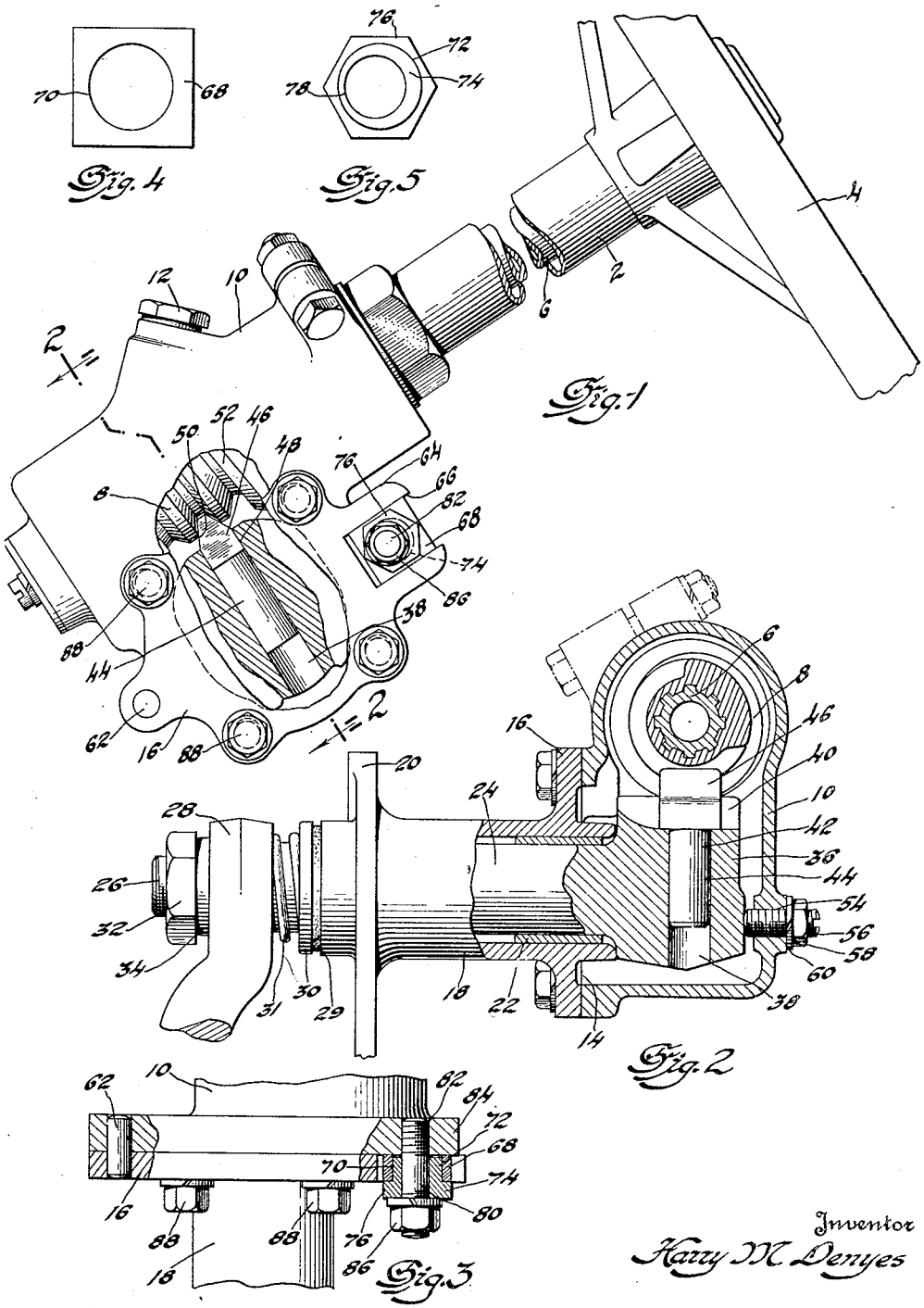

1,843,081

UNITED STATES PATENT OFFICE

HARRY M. DENYES, OF SAGINAW, MICHIGAN, ASSIGNOR TO GENERAL MOTORS CORPORATION, OF DETROIT, MICHIGAN, A CORPORATION OF DELAWARE

STEERING MECHANISM

Application filed May 6, 1929. Serial No. 360,774.

This invention relates to steering devices and has particular reference to improvements in the gearing mechanism at the bottom of the steering column of automotive vehicles.

The essential feature of the invention resides in the provision of a tooth having a shank portion fitting in an opening in a shaft mounted in bearings in a cover plate at the bottom of the steering column. The tooth has a broad surface at one of its ends which broad surface fits in a slot in the shaft to rigidly hold the tooth in position and to cause the shaft to turn in its bearings in response to movements of the tooth. The tooth meshes with a worm of the Hindley type secured at the bottom of the steering column. The tooth is readily removable and has a broad end portion giving increased strength.

Another feature of the invention relates to the specific means for adjusting the tooth toward and away from the worm to obtain initial proper adjustment or to compensate for wear. The adjustment is accomplished by pivoting at one of its sides the cover for the housing which encloses the worm and tooth. At the side of the cover opposite the pivotal point a slot is provided and in this slot there is adapted to fit a conformably shaped block provided with an opening. In the opening there is received a washer or bushing provided with an eccentric opening and with a polygonal head by means of which the washer or bushing may be turned. In the eccentric opening there is received a bolt by means of which the adjusted cover is secured in position and which prevents the relative rotation of the cover, bolt, housing, and bushing.

On the drawings:

Fig. 1 shows the steering column of an automotive vehicle with parts broken away and shown in section to illustrate the invention.

Fig. 2 is a partial sectional view on the line 2—2 of Fig. 1.

Fig. 3 is a view of the adjusting mechanism with parts shown in section.

Figs. 4 and 5 are detailed views of the block and eccentric bushing by means of which the adjustment is accomplished.

Referring to the drawings, the numeral 2 indicates the mast or column of a steering mechanism, 4 a steering wheel, 6 the rotatable steering tube, at the bottom of which there is secured the worm 8 which is of the Hindley or hour-glass type. The worm 8 is enclosed in the housing 10 provided with a suitable lubricant opening closed by the plug 12.

The housing 10 is open at one side as indicated at 14 and over the opening 14 there is applied the cover 16. The cover is formed as an integral portion of the tube or cylindrical member 18 having the flange 20 at its opposite end. The flange 20 is adapted to be secured to the side bar of a chassis frame to rigidly hold the housing and lower end of the steering column in position.

Inside the tube 18 there are mounted the bearing bushings 22 which form bearings for the shaft 24, to the free end 26 of which there is rigidly attached the arm 28 which operates a suitable linkage to steer the front wheels of a vehicle. The arm 28 and the end of the tube 18 have interposed a packing 29, washer 30 and spring 31 to exclude dirt from the shaft bearings. The arm is securely held at its outer end by means of the spacing washer 34 and the nut 32 threaded on the end 26.

The opposite end 36 of the shaft 24 is enlarged as shown in Figs. 1 and 2 and is provided with a bore or an opening 38, and a slot 40 at one edge, which slot is transverse to the opening 38.

Fitting in the opening 38 and the slot 40 is the member 42 which comprises the shank portion 44 adapted to be received in the opening 38, and the upper flat sided head portion 46 formed as a tooth and having its sides abutting the sides of the slot 40 as shown at 48 in Fig. 1. The top of the tooth 46 is tapered as shown in Fig. 1 and the tapered portion 50 is received between the threads 52 of the Hindley type worm 8.

The housing 10 is provided with a suitably threaded opening as indicated at 54 and in this opening there is received the threaded bolt 56, the end of which abuts against the end face of the shaft 24. By suitably turning the bolt 56 in one direction or the other, a proper longitudinal adjustment of the position of the shaft 24 and the member 42 is accomplished. A lock nut 58 and washer 60 are applied to rigidly hold the shank 56 in position.

The cover 16 which closes the opening 14 is pivoted at one of its edges by a pin 62. The opposite edge 64 is slotted as at 66 and in the slot there is received the block 68 provided with an opening 70. In the opening 70 there is received the cylindrical portion 72 of a bushing or washer 74 provided with a polygonal head 76 by means of which it may be turned. The bushing or washer 74 is provided with an eccentric opening 78 as is best shown in Figs. 3 and 5. In the eccentric opening 78 there is received the shank of a bolt 80 threaded as at 82 to be received in a threaded opening in a flange 84 on the housing 10. Before the bolt 82 is tightened by means of the nut 86 on its end, the bushing or washer 74 is suitably adjusted by rotating the polygonal head 76 and after the tapered portion 50 (which necessarily moves with the cover 16) is in proper adjusted position with reference to the worm, the nut 86 is screwed home to rigidly hold the bolt, eccentric bushing, block cover, and housing relatively immovable. Additional bolts 88 are then applied to securely hold the cover 16 on to the housing 10. The openings for the bolts 88 are of course oversize.

It will be understood that because of the mounting of the shaft 24 and the bushing or bearings 22 in the cylindrical portion 18 that the end 36 of the shaft and the member 42 must necessarily move with the cover so that the adjustment of the cover is for the purpose of adjusting the tooth inwardly of or outwardly from the worm 8.

The best art known is:

Hooper—1,635,847—July 12, 1927
Marles—1,686,704—Oct. 9, 1928
Marles (Br.) 196,374
Hawkins (Br.) 3,822/1876

I claim:

1. In a steering device including a turnable steering worm, a shaft connected to a steering mechanism and operated from said worm, and a tooth fitting in a slot in said shaft and forming the connection between worm and shaft whereby the turning of the worm accomplishes steering through the operation of said mechanism.

2. In a steering device including a turnable steering worm, a shaft operated from said worm, and a tooth having a shank portion mounted in an opening in said shaft and a head portion received in a slot in said shaft, said tooth mating with said worm and operable to turn said shaft in response to movements of said worm whereby steering is accomplished through the actuation of a steering mechanism.

3. In a steering device including a turnable steering worm, a housing for said worm, a cover for said housing, a shaft movable with said cover and extending into said housing, means on the end of said shaft mating with said worm to cause the rotation of said shaft in response to movements of the worm, a recess in said cover at one edge thereof, a conformably shaped member fitting in said recess and provided with an opening, a bushing fitting in said opening and provided with an eccentric opening, a polygonal head on said bushing by means of which it may be rotated, a bolt passing through said eccentric opening to secure said cover in adjusted position and rigidly hold said bushing, cover, bolt and housing relatively immovable.

In testimony whereof I affix my signature.

HARRY M. DENYES.